US007777373B2

(12) United States Patent
Bott et al.

(10) Patent No.: US 7,777,373 B2
(45) Date of Patent: Aug. 17, 2010

(54) COOLING DEVICE OF AN ELECTRICAL MACHINE

(75) Inventors: Erich Bott, Hollstadt (DE); Detlef Potoradi, Bad Neustadt/Saale (DE); Rolf Vollmer, Gersfeld (DE)

(73) Assignee: Siemens Aktiengesellschaft, München (DE)

(*) Notice: Subject to any disclaimer, the term of this patent is extended or adjusted under 35 U.S.C. 154(b) by 321 days.

(21) Appl. No.: 11/575,923

(22) PCT Filed: Sep. 20, 2005

(86) PCT No.: PCT/EP2005/054690

§ 371 (c)(1),
(2), (4) Date: Mar. 23, 2007

(87) PCT Pub. No.: WO2006/034976

PCT Pub. Date: Apr. 6, 2006

(65) Prior Publication Data

US 2008/0073985 A1 Mar. 27, 2008

(30) Foreign Application Priority Data

Sep. 27, 2004 (DE) ....................... 10 2004 046 821

(51) Int. Cl.
*H02K 9/20* (2006.01)
*H02K 9/00* (2006.01)

(52) U.S. Cl. .......................................... 310/58; 310/64

(58) Field of Classification Search .................. 310/58, 310/54, 64
See application file for complete search history.

(56) References Cited

U.S. PATENT DOCUMENTS

| | | | | |
|---|---|---|---|---|
| 1,700,840 | A * | 2/1929 | Gay | 310/52 |
| 3,801,843 | A * | 4/1974 | Corman et al. | 310/52 |
| 4,240,000 | A * | 12/1980 | Harano et al. | 310/54 |
| 4,295,067 | A * | 10/1981 | Binder et al. | 310/52 |
| 4,322,646 | A * | 3/1982 | Persson | 310/64 |
| 4,602,177 | A | 7/1986 | Eckels et al. | |
| 6,822,352 | B2 * | 11/2004 | Nimz et al. | 310/58 |
| 6,943,467 | B2 * | 9/2005 | Potoradi et al. | 310/52 |
| 7,064,463 | B2 * | 6/2006 | Matin et al. | 310/52 |
| 7,102,267 | B2 * | 9/2006 | Gromoll et al. | 310/260 |
| 7,402,924 | B2 * | 7/2008 | Bibeau et al. | 310/54 |
| 2001/0042615 | A1 * | 11/2001 | Moore et al. | 165/104.33 |
| 2002/0053421 | A1 * | 5/2002 | Hisano et al. | 165/104.33 |

(Continued)

FOREIGN PATENT DOCUMENTS

DE 2 330 172 1/1974

(Continued)

*Primary Examiner*—Burton Mullins
(74) *Attorney, Agent, or Firm*—Henry M. Feiereisen; Ursula B. Day

(57) ABSTRACT

The invention relates to a cooling device (1,2) pertaining to an electrical machine (10), said cooling device (1,2) comprising at least one rod-shaped heat-conducting means (3,4) for heat-conductive connection to the electrical machine (10). The invention also relates to an electrical machine (10) comprising a housing (18) and/or a stator (14), said housing (18) and/or stator (14) being applied to a cooling device (1,2) comprising a rod-shaped heat-conducting means (3,4) extending axially in relation to the electrical machine. Said heat-conducting means (3,4) is to be received by the stator (14) and/or the housing (18) or arranged on the stator (14) and/or the housing (18).

10 Claims, 4 Drawing Sheets

U.S. PATENT DOCUMENTS

| | | | | |
|---|---|---|---|---|
| 2007/0062038 | A1 * | 3/2007 | Hou et al. | 29/890.032 |
| 2008/0252157 | A1 * | 10/2008 | Muller et al. | 310/64 |

FOREIGN PATENT DOCUMENTS

| | | | |
|---|---|---|---|
| DE | 28 10 222 | | 8/1979 |
| DE | 41 07 399 | A1 | 9/1992 |
| DE | 197 57 605 | | 5/1993 |
| DE | 42 42 132 | | 6/1994 |
| DE | 197 42 256 | C1 | 11/1998 |
| DE | 197 49 106 | | 4/1999 |
| DE | 100 05 128 | A1 | 8/2001 |
| DE | 102 58 778 | A1 | 7/2004 |
| JP | 53015502 | | 2/1978 |
| JP | 1-150615 | U | 10/1989 |
| JP | 04121038 | | 4/1992 |
| JP | 6-26772 | * | 2/1994 |
| JP | 9-149567 | A | 6/1997 |
| JP | 2003 070208 | | 3/2003 |
| JP | 2003-230253 | A | 8/2003 |

* cited by examiner

COOLING DEVICE OF AN ELECTRICAL MACHINE

BACKGROUND OF THE INVENTION

The invention relates to a cooling device for an electrical machine or to the electrical machine itself and to a cooling system for an electrical machine.

In an electrical machine, heat losses occur during operation which need to be dissipated by a corresponding cooling system or a corresponding cooling device. In order to cool the electrical machine, for example, cooling systems or cooling devices can be used which operate with cooling air, cooling water or heat pipes. Such cooling systems or cooling devices are integrated in the electrical machine, each electrical machine having a cooling device, which is designed for this electrical machine.

DE 42 42 132 has disclosed, for example, an electrical machine which is air-cooled. One disadvantage with such an electrical machine is the fact that the cooling device is designed irrespective of the thermal load on the electrical machine at the use location of the electrical machine. The thermal load on the electrical machine is, for example, dependent on the operating states to be expected of the electrical machine, the operating states being reflected, for example, in alternations of load. The cooling device is designed for the most problematic operation case of the electrical machine without taking into consideration the fact that some, possibly critical, alternations of load of the electrical machine are not necessary for a specific use of the electrical machine.

SUMMARY OF THE INVENTION

The object of the present invention is to specify a cooling device for an electrical machine with the aid of which the cooling power can be matched as required.

According to one aspect of the present invention, the object is achieved by a cooling device having at least one rod-shaped heat-conducting means, the rod-shaped heat-conducting means being provided for the thermally conductive connection to the electrical machine.

According to another aspect of the present invention, the object is achieved by an electrical machine which has a housing and/or a stator, wherein the housing and/or the stator is provided for fitting a cooling device, which has heat-conducting means running axially with respect to the electrical machine.

According to yet another aspect of the present invention, the object is achieved by a cooling system for an electrical machine, which can be cooled by means of a cooling device, wherein a mechanical interface is formed between the electrical machine and the cooling device and makes it possible to use various cooling devices with different cooling effects and/or different cooling means.

A cooling device for an electrical machine has at least one rod-shaped heat-conducting means, the rod-shaped heat-conducting means being provided for the thermally conductive connection to the electrical machine. Heat can be conducted out of the electrical machine into the cooling device from the rod-shaped heat-conducting means. For the purpose of emitting the heat, the cooling device has a heat sink for convection cooling, for example, and/or a connection to a coolant such as, for example, a liquid or air as a gaseous coolant. The electrical machine is thus cooled. The rod-shaped heat-conducting means is, for example, a heat pipe, a rod consisting of a solid material (i.e. not hollow) or else a hollow rod, in which a coolant can be conducted.

The rod-shaped heat-conducting means can therefore guide the heat axially, for example, out of a hot region of the stator of the electrical machine and emit the heat to a heat sink or a coolant. The heat sink can be cooled particularly effectively for example by an air flow produced by a fan. When using liquid cooling (for example water cooling) it is advantageous if, for example, the water is guided directly into the heat-conducting elements and also guided back.

In one advantageous configuration, the electrical machine is designed such that it has accommodating channels for the rod-shaped heat-conducting means. The accommodating channels are, for example, within a stator laminate stack of the electrical machine and/or within a housing of the electrical machine, the accommodating channels being open towards a front end of the stator. Advantageously, the accommodating channels extend axially over a large proportion of the axial extent of the stator. The rod-shaped heat-conducting means advantageously fill a large proportion of the accommodating channels. If the cooling device is fitted to the electrical machine, the cooling device can be regarded as part of the electrical machine.

In a further configuration of the invention, the electrical machine is designed to be compatible with at least two cooling devices such that the electrical machine has such a large number of accommodating channels that it is provided and is suitable for accommodating both a first cooling device and for accommodating a second cooling device, the first cooling device having a number of rod-shaped heat-conducting means which is different than that of the second cooling device. The stator of the electrical machine and/or the housing of the electrical machine therefore has a number of accommodating channels which can go beyond the number of rod-shaped heat-conducting means of different cooling devices. A modular use of cooling devices having different cooling effects is therefore possible on one and the same stator or housing of the electrical machine. The cooling power required for an electrical machine in its respective area of use can therefore be achieved by selecting a specific cooling device from a number of different cooling devices with different cooling powers.

Different cooling powers can also be achieved by different cooling concepts in the cooling device. Cooling devices can be designed for water cooling or air cooling, for example. Since the stator and/or the housing of the electrical machine to be cooled only has to ensure that the rod-shaped heat-conducting means are accommodated, an electrical machine having a specific design can be cooled using different cooling concepts.

The rod-shaped heat-conducting means can be provided not only for being accommodated in accommodating channels in the stator and/or in the housing of the electrical machine. In an advantageous configuration of the electrical machine, the rod-shaped heat-conducting means bear against an outer side of the stator and/or the housing of the electrical machine. If the rod-shaped heat-conducting means are provided for the purpose of them bearing against a surface of the stator and/or of the housing of the electrical machine, this is more cost-effective than the use or production of accommodating channels within the stator or the housing of the electrical machine. The electrical machine can not only be designed as a motor with rotary operation but also as a linear motor. In linear motors, there is no axis of rotation in accordance with which the alignment of the rod-shaped heat-conducting means could take place. For this reason, the rod-shaped heat-conducting means in a linear motor are aligned, for example, along a movement axis or at right angles to a movement axis.

The invention has the advantage of, if necessary, optimum focusing of the cooling. This relates in particular to electrical machines without a housing which are air-cooled. In electrical machines without a housing, until now dedicated cooling over the surface of the electrical machine has been known, for example. For improved cooling, an enlarged cooling area is required on the electrical machine. Disadvantageously, this increases the physical dimensions of the electrical machine.

In a further advantageous configuration, the rod-shaped heat-conducting means is provided for an axial alignment with respect to the electrical machine. In a rotary electrical machine, the axis of the axial alignment is the axis of rotation. If, therefore, the cooling device of the electrical machine is at the installation location or at the attachment location on the electrical machine, the rod-shaped heat-conducting means is aligned approximately parallel to the axis of the electrical machine, which is in particular a rotary electrical machine. A largely parallel alignment with respect to the axis is referred to as an axial alignment. The use of the axial alignment makes it possible for the rod-shaped heat-conducting means to be capable of reaching over a wide region of the longitudinal axis of the electrical machine. This has the advantage that the electrical machine can emit heat to the heat-conducting means to the greatest possible extent over its entire longitudinal region.

Advantageously, at least one cooling device is fitted in the region of a mounting plate of the electrical machine. Furthermore, the electrical machine can also be designed such that it has two cooling devices, in each case one cooling device being positioned in the region of the front end of the rotary electrical machine.

In a further advantageous configuration, the cooling device has a plurality of rod-shaped heat-conducting means, these advantageously being distributed largely symmetrically with respect to the axis of rotation of the electrical machine. Owing to the largely symmetrical distribution, it is possible to achieve a situation in which the heat is transported away uniformly.

In a further embodiment of the cooling device, the rod-shaped heat-conducting means can be fitted in a stator of the electrical machine and/or in a housing of the electrical machine and/or on an outer face of the electrical machine. Both when it is fitted in a stator or in a housing of the electrical machine and when it is fitted on the outer face of the electrical machine, the rod-shaped heat-conducting means is in contact with these corresponding parts. This contact makes it possible for thermal energy to be transmitted. The transmission can be improved, for example by the use of heat-conducting paste. Then, in an advantageous configuration, heat-conducting paste is located between the rod-shaped heat-conducting means and the stator or the housing or an outer face of the electrical machine. The greater the contact area between the stator, the housing or the outer face of the electrical machine and the rod-shaped heat-conducting means, the better the cooling power is.

In a further advantageous configuration, the rod-shaped heat-conducting means is hollow. For example cooling air or cooling liquid can be conducted in the cavity. With the aid of this coolant (cooling air or cooling liquid), thermal energy can be dissipated from the electrical machine. In a further advantageous configuration, the cavity is split into at least two cavities by means of a separating means, such as a partition wall, for example, the cavities being connected to one another at least partially. In this way, a forward channel and a return channel can be formed for the coolant within the rod-shaped heat-conducting means.

A further advantageous configuration results if the cooling device can be plugged onto an electrical machine. A cooling device which can be plugged on has the advantage that it can be replaced relatively easily. Advantageously, the rod-shaped heat-conducting means act as guide pins for the plug-in connection between the cooling device and the electrical machine. For this purpose, the electrical machine has, for example, the accommodating channels in the stator and/or the housing of the electrical machine. The rod-shaped heat-conducting means can be introduced into the accommodating channels.

In a further advantageous configuration, the rod-shaped heat-conducting means have a conical design. Owing to the conical design, the procedure for plugging the cooling device onto the electrical machine is facilitated. Advantageously, in the case of a conical design of the rod-shaped heat-conducting means, the accommodating channel in the stator or in the housing of the electrical machine also has an inverse conical shape matching the rod-shaped heat-conducting means.

The object of the invention is achieved in the case of an electrical machine (in particular a rotary electrical machine) which has a housing and/or a stator, the housing and/or the stator being provided for fitting a cooling device which has heat-conducting means running axially with respect to the electrical machine. In order to fit the cooling device, the heat-conducting means can be sunk into accommodating channels of the stator or of the housing. The accommodating channels advantageously extend over a large proportion of the region of the stator or of the housing in the longitudinal direction. The longitudinal direction is predetermined by the axis of rotation of the electrical machine. The electrical machine has, for example, a large number of channels. Depending on the cooling power required for an application case of the electrical machine, cooling devices of different types can then be used. The cooling devices may correspond to one of the above-described embodiments. As a result of the fact that different cooling devices can be used for an electrical machine, a cooling system is formed.

In one advantageous configuration, various types of cooling devices can also be used. It is also possible to build up a cooling system from this. In a cooling system for an electrical machine which can be cooled by means of a cooling device, a mechanical interface is formed between the electrical machine and the cooling device and makes it possible to use various cooling devices with different cooling effects and/or different cooling means. If the cooling device uses, for example, cooling air for cooling purposes, the use of the cooling air is a favorable means for cooling an electrical machine. A higher cooling power is made possible by the use of a cooling liquid. The use of a cooling liquid in turn has the consequence, however, that there is greater complexity owing to the risk of leaks occurring.

In an advantageous configuration of the electrical machine, the machine has a large number of channels for accommodating rod-shaped heat-conducting means. Depending on the direct cooling power, various types of cooling devices can then be connected. If the electrical machine has, for example, 20 channels, cooling devices can be used which have, for example, 4, 8, 12, 16, 20 or else any other number between 1 and 20 of rod-shaped heat-conducting means. The rod-shaped heat-conducting means are plugged into the accommodating channels. The greater the number of rod-shaped heat-conducting means, the greater the potential thermal energy is which can be dissipated by the cooling device. A flexible cooling system for cooling an electrical machine is thus specified, a uniform interface between the electrical machine and the cooling device making it possible to use various cooling devices with different cooling powers.

BRIEF DESCRIPTION OF THE DRAWING

The invention will be explained in more detail with reference to the exemplary embodiments illustrated in the drawing, in which.

DETAILED DESCRIPTION OF PREFERRED EMBODIMENTS

Figure 1:
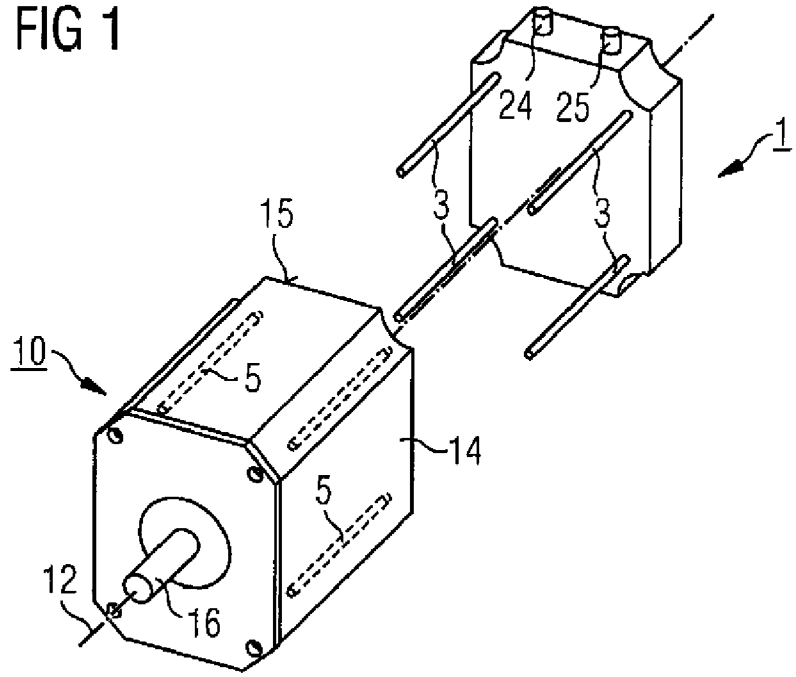
FIG. 1 shows a rotary electrical machine with a cooling device.

The illustration shown in FIG. 1 shows an electrical machine 10. The electrical machine 10 is a rotary electrical machine without a housing and having an axis 12. Furthermore, the electrical machine 10 has a shaft 16 and a stator 14. Accommodating channels 5 are provided in the stator 14. The accommodating channels 5 are used for accommodating rod-shaped heat-conducting means 3. The illustration shown in FIG. 1 also shows a cooling device 1. The cooling device 1 has connections 24 and 25. The connections are used, for example, for accommodating or emitting cooling liquid or else cooling air. Furthermore, the cooling device 1 has rod-shaped heat-conducting means 3. The rod-shaped heat-conducting means 3 are designed such that they can be introduced into the accommodating channels 5. In a further configuration, which is not illustrated in FIG. 1, however, the stator 14 has the rod-shaped heat-conducting means 3, the rod-shaped heat-conducting means 3 protruding out of a front end 15 of the electrical machine 10, a cooling device 1 being capable of being placed onto the protruding parts of the rod-shaped heat-conducting means 3.

The electrical machine 10 in FIG. 1 therefore has accommodating channels 5 as axial cutouts at suitable points on its front end 15. Suitable points are, in particular, those which are not provided for guiding a magnetic flux. The axial cutouts, which can be produced, for example, by means of a drilled hole, do not impair the normal operation of the electrical machine 10 without cooling. If required, the cooling device 1 can then be placed axially onto an operating side 15 of the electrical machine and fixed in a suitable manner. The cooling device 1 has a number of rod-shaped heat-conducting means 3 which corresponds to the number and shape of the cutouts, these heat-conducting means, preferably provided with a heat-conducting paste, dipping precisely into these cutouts.

Figure 2:
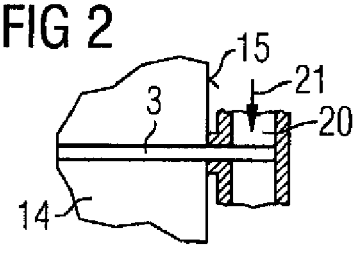
FIG. 2 shows a first type of cooling device.

The illustration shown in FIG. 2 shows a detail of a stator 14, in which a rod-shaped heat-conducting means 3 is located. The rod-shaped heat-conducting means protrudes beyond the front end 15 of the stator 14. A cooling channel 20 is placed on the protruding section of the rod-shaped heat-conducting means 3. The cooling channel 20 is provided, for example, for guiding cooling liquid. A possible direction of flow 21 of the cooling liquid is illustrated by an arrow. The rod-shaped heat-conducting means 3 protrudes into the cooling channel 20 and, in the process, has cooling liquid flowing around it, with the result that heat dissipation can be realized.

Figure 3:
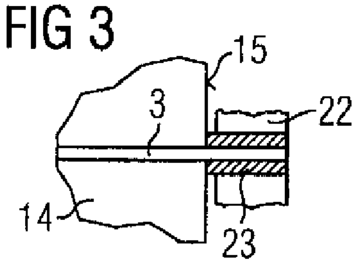
FIG. 3 shows a further type of cooling device.

The illustration shown in FIG. 3 shows a further embodiment of possible heat dissipation. The rod-shaped heat-conducting means 3 is located in a stator 14, which is illustrated as a detail. The rod-shaped heat-conducting means 3 protrudes out of the stator 14. A heat sink 22 is placed on the protruding part of the rod-shaped heat-conducting means 3. The heat dissipation from the rod-shaped heat-conducting means 3 into the heat sink 22 is achieved in a particularly advantageous manner by the use of a heat-conducting paste 23.

Figure 4:
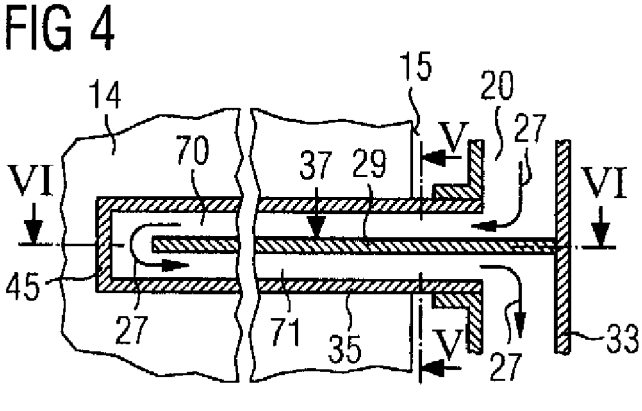
FIG. 4 shows a further type of cooling device, which has a partition wall.

The illustration shown in FIG. 4 shows a further possibility for cooling the stator 14. A pipe 35 is introduced into the stator 14. The pipe 35 is a possible embodiment of the rod-shaped heat-conducting means. The cooling channel 20 is plugged onto the pipe 35, with the result that, for example, a cooling liquid can be conducted directly through said cooling channel 20. The pipe 35, which is closed at one end, and the cooling channel 20 are split by a separating means 29 such that a coolant is guided from the cooling channel 20 into a first half of the pipe 35, and the coolant is guided into a second half of the pipe 35 at a base 45 of the pipe 35. The separating means 29 is a type of wall, which divides the pipe 35 into a first half and a second half, the wall reaching from the cooling channel 20 almost up to the base 45 of the pipe 35. The first half forms a channel 70 and the second half forms a channel 71. The base 45 is therefore spaced apart from the separating means 29. The separating means 29, which is manufactured, for example, from sheet metal, is arranged within the cooling channel 20 such that the coolant is conducted partially or completely into the pipe 35. In the illustration shown in FIG. 4, a direction of flow of coolant is illustrated by means of arrows 27, a forward flow being formed by the channel 70 and a return flow being formed by the channel 71. The pipe 35 has been plugged into the stator 14 either in communication with the cooling channel 20 or else separate from it, with the result that, once the pipe 35 has been plugged into the stator 14, the cooling channel 20 is then plugged onto that part of the pipe 35 which protrudes beyond the front end 15 of the stator 14.

Figure 5:
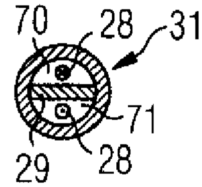
FIG. 5 shows a section through the cooling device shown in FIG. 4.
Figure 6:
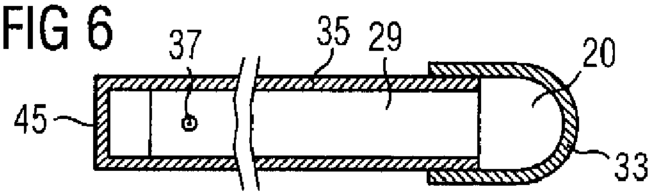
FIG. 6 shows a further section through the cooling device shown in FIG. 4.

The illustration shown in FIG. 4 also shows two sectional planes V and VI. The sectional plane V is illustrated in FIG. 5 and shows a cross section of the pipe 35. The pipe 35 is split into two channels 70 and 71 by the separating means 29, which acts as a type of wall. The direction of flow of the coolant is indicated by circles. The sectional plane VI, which is illustrated in FIG. 6, shows a plan view 37. In this sectional plane VI it is shown that the separating means 29 does not reach up to the base of the pipe 35, with the result that there is a connection between the forward flow and the return flow. Furthermore, a wall 33 of the cooling channel 20 is also shown.

Figure 7:
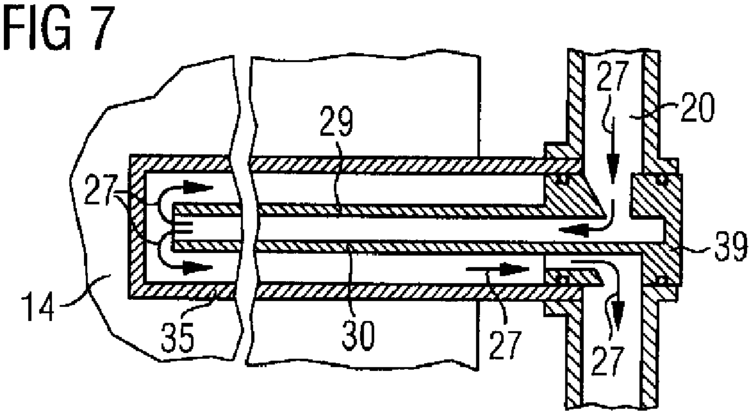
FIG. 7 shows a further type of cooling device, which has two partition walls.

The illustration shown in FIG. 7 shows a further embodiment of a pipe 35, which is introduced into a stator 14 as a rod-shaped heat-conducting means. The pipe 35 now has two separating means 29 and 30, the separating means being in the form of partition walls, as was already the case in FIG. 4. The connection of the pipe 35 again takes place by a cooling channel 20. A cooljet 39 is used for introducing a coolant into the pipe 35. The profile of the direction of flow of coolants (gaseous or liquid) 27 is also illustrated in FIG. 7 by means of arrows 27.

Figure 8:
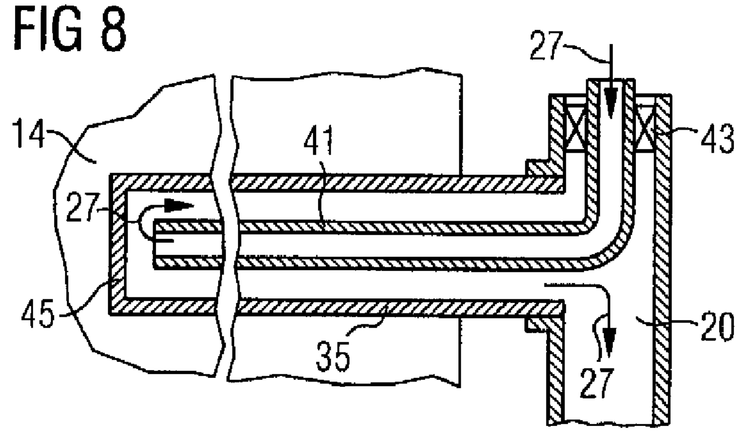
FIG. 8 shows a further type of cooling device, which has a pipe-in-pipe system.

The illustration shown in FIG. 8 shows a pipe 35, into which an injection pipe 41 is introduced. The injection pipe 41 leads into the region of the base 45 of the pipe 35. The injection pipe not only protrudes into the pipe 35 but also into the cooling channel 20. In this case, the positioning of the injection pipe 41 into the cooling channel 20 is implemented such that the injection pipe 41 takes up the cooling liquid in the region in which the coolant is supplied. The injection pipe 41 is sealed off from the cooling channel 20 by means of a seal 43.

Figure 9:
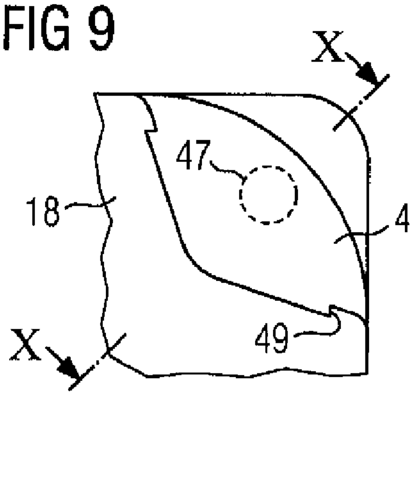
FIG. 9 shows a further type of cooling device, which has a rod-shaped heat-conducting means, which bears against the housing of the electrical machine.
Figure 10:
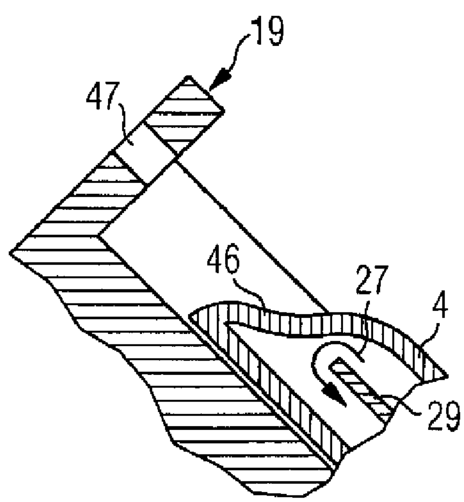
FIG. 10 shows a section through the cooling device shown in FIG. 9.
Figure 11:
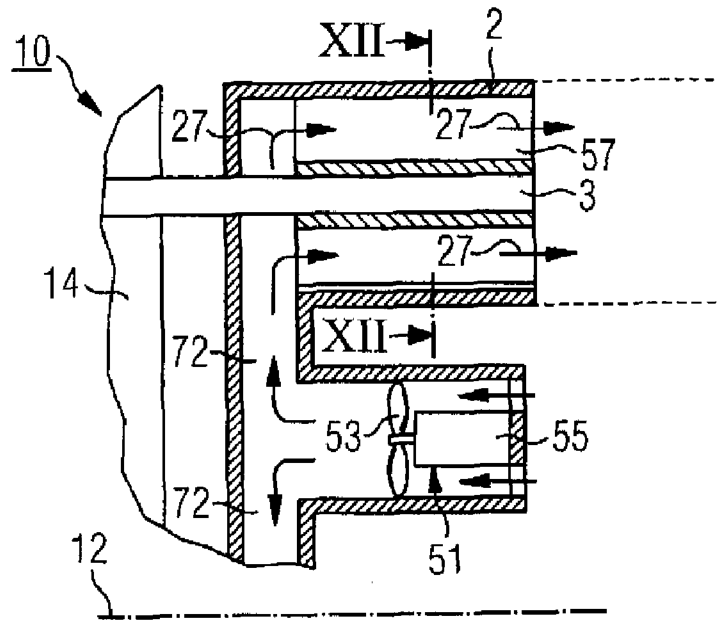
FIG. 11 shows a further type of cooling device.
Figure 12:
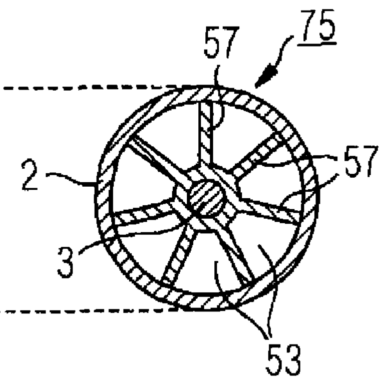
FIG. 12 shows a section through the cooling device shown in FIG. 11.
Figure 14:
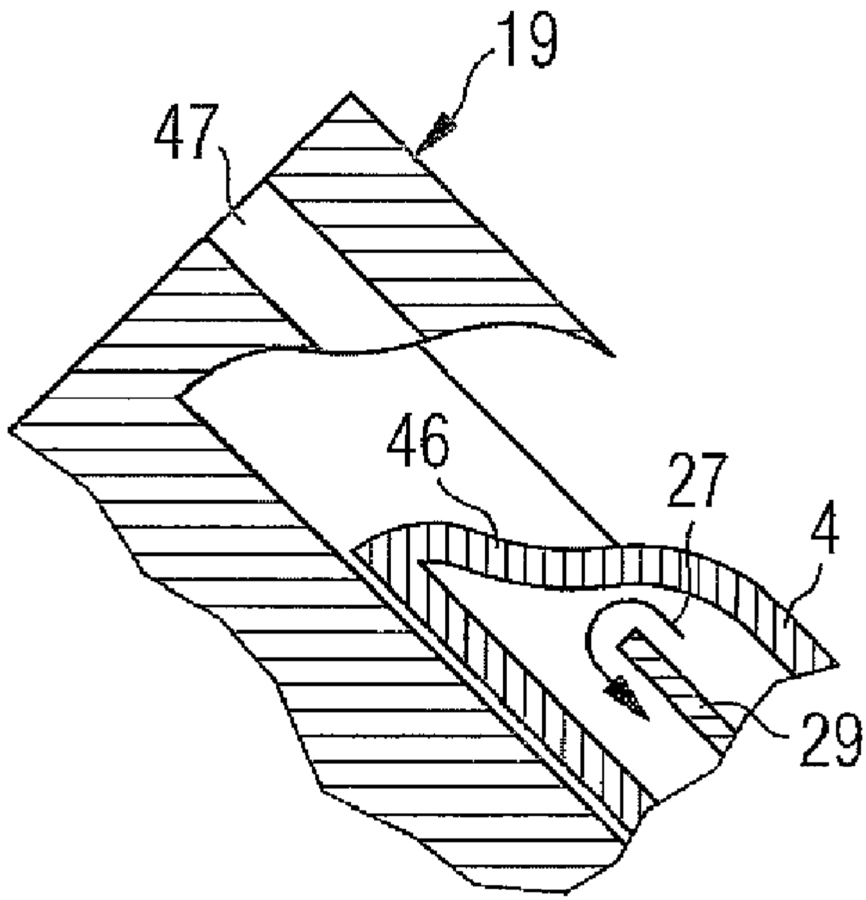
FIG. 14 shows a section through a modified cooling device.

The illustration shown in FIG. 9 shows a housing 18 of an electrical machine, which is not illustrated in any more detail. A rod-shaped heat-conducting means 4 bears against the housing 18. In particular corners of the housing and/or of the stator of the electrical machine are suitable for this purpose. The rod-shaped heat-conducting means 4 is fixed to the housing 18, for example, via a toothed portion 49, the illustrated toothed portion being a dovetailed connection. The rod-shaped heat-conducting means 4, which have a base 46, is designed such that it does not reach up to a housing end 19. This is shown in FIG. 10, FIG. 10 illustrating a section X from FIG. 9. As illustrated in FIG. 10, the base 46 therefore ends in front of the housing end 19. Furthermore, the base 46 is flattened obliquely such that easier access to a fixing means 47 is possible. The fixing means 47 is, for example, a drilled hole, which is used for fixing the housing 18 on a base plate. As shown in FIG. 14, the base 46 of the rod-shaped heat-conducting means 4 and the housing end 19 can have matching tapered configuration. The illustration shown in FIG. 11 shows a further embodiment of the cooling device 2. A rod-shaped heat-conducting means 3 is located in the stator 14 of an electrical machine 10. The rod-shaped heat-conducting means 3 is in the form of solid material and consequently does not have a cavity. The rod-shaped heat-conducting means 3 protrudes out of the stator 14. A cooling device is placed onto the rod-shaped heat-conducting means 3. The cooling device has a fan 51. The fan 51 has a fan motor 55. Cooling air can be sucked by means of the fan 51. The profile of the cooling air is illustrated by arrows 27. The cooling air is guided to the rod-shaped heat-conducting means 3 via channels 72, only one rod-shaped heat-conducting means 3 being illustrated in FIG. 8, but it being possible for a plurality to be provided on the electrical machine 10. The rod-shaped heat-conducting means 3 is placed onto a cooling grating 75, which is illustrated in detail in FIG. 12. FIG. 12 shows a section XII from FIG. 11. The cooling grating 75 illustrated in FIG. 12 has cooling air channels 59 and cooling ribs 57. The rod-shaped heat-conducting means 3 is now placed onto the cooling grating 75 such that the rod-shaped heat-conducting means 3 emits heat to the cooling ribs 57, it being possible for heat to be emitted, via the cooling ribs 57, to cooling air which is guided past it and can be driven by means of the fan.

Figure 13:
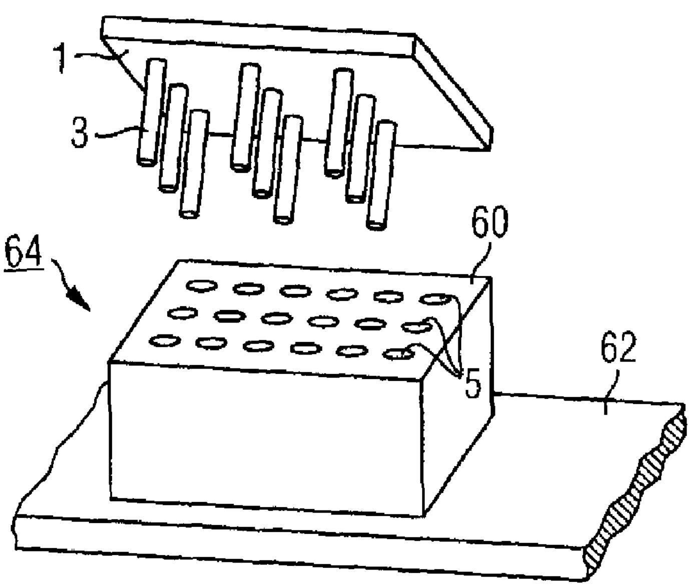
FIG. 13 shows a linear motor with a cooling device.

The illustration shown in FIG. 13 shows a linear motor 64, which has a primary part 60 and a secondary part 62. The primary part 60 has accommodating channels 5. The accommodating channels 5 serve the purpose of accommodating rod-shaped heat-conducting means 3 of a cooling device 1. The illustration shown in FIG. 13 shows that the cooling device according to the invention can be used not only in rotary electrical machines but also in linear motors. Furthermore, it can be seen from FIG. 13 that an axial alignment of the rod-shaped heat-conducting means 3 is not necessary or advantageous in every case, and therefore another alignment is also possible.

What is claimed is:

1. An electrical machine, comprising:

a housing;

a cooling device having at least one heat-conducting member extending axially with respect to the electrical machine, said heat-conducting member having a rod-shaped configuration and effecting a thermally conductive connection to the housing, wherein the component is constructed for attachment of the cooling device, wherein the heat-conducting member is constructed to realize an axial alignment with respect to the housing, wherein the housing has a channel extending beyond an axial center of the electrical machine for accommodating the heat-conducting member of the cooling device, and wherein the heat-conducting member has an outer tapering end shape sized to extend shy from an opposite wall of the housing to allow access to a fixing means for securement of the housing.

2. The electrical machine of claim 1, wherein the heat-conducting member is hollow.

3. The electrical machine of claim 2, wherein the hollow heat-conducting member defines a cavity which is separated in two interconnected spaces to allow a circulation of coolant.

4. The electrical machine of claim 1, wherein the cooling device is constructed for plug connection onto the component.

5. The electrical machine of claim 1, wherein the cooling device has a plurality of heat-conducting members, and the component has a plurality of channels, wherein the number of heat-conducting members is smaller than the number of channels for allowing acceptance of more than one of said cooling device.

6. The electrical machine of claim 1, further comprising a stator laminate stack formed with channels.

7. The electrical machine of claim 1, constructed in the form of a rotary electrical machine, and further comprising a further cooling device, said two cooling devices being positioned in the region of a front end of the rotary electrical machine.

8. The electrical machine of claim 1, wherein the cooling device has a plurality of such rod-shaped heat-conducting members which are distributed substantially symmetrically with respect to an axis of rotation of the electrical machine.

9. The electrical machine of claim 8, further comprising a heat-conducting paste located between the rod-shaped heat-conducting members and the housing.

10. The electrical machine of claim 1, wherein the channel is tapered to complement the tapered configuration of the heat-conducting member.

* * * * *

UNITED STATES PATENT AND TRADEMARK OFFICE

CERTIFICATE OF CORRECTION

PATENT NO. : 7,777,373 B2
APPLICATION NO. : 11/575923
DATED : August 17, 2010
INVENTOR(S) : Erich Bott et al.

It is certified that error appears in the above-identified patent and that said Letters Patent is hereby corrected as shown below:

Title page,

On page 2 of the cover page, item (56) Cited References

FOREIGN PATENT DOCUMENTS

Line 5, replace “DE 197 42 256 C1” with -- DE 197 42 255 C1 --.

Signed and Sealed this

Twenty-sixth Day of October, 2010

David J. Kappos

*Director of the United States Patent and Trademark Office*